Patented Jan. 23, 1934

1,944,530

UNITED STATES PATENT OFFICE 1,944,530

PHOSPHORIC ACID ESTERS

Curt Schönburg, Bitterfeld, Germany, assignor to I. G. Farbenindustrie Aktiengesellschaft, Frankfort-on-the-Main, Germany No Drawing. Application April 8, 1930, Serial No. 442,689, and in Germany April 8, 1929

10 Claims. (Cl. 260—98)

The present invention relates to new phosphoric acid esters of glycol ethers and a method for producing same.

The tertiary neutral phosphoric acid esters of glycol monoethers disclosed by the present application were hitherto unknown. When submitting the glycols themselves to reaction with phosphoric acid or phosphorus oxychloride, acid mono- or di-substituted phosphoric acid esters of the glycols are obtained. The mono-alkylethers and glycols when esterified with phosphoric acid on the other hand are also converted into acid esters.

According to the present invention, phosphorus oxy-chloride and glycol mono-alkyl or -aryl ethers, the ethers being in large excess, are brought into reaction, this resulting in the formation of tertiary neutral phosphoric acid esters of glycol-mono-alkyl- (or aryl-) ethers. These products where hitherto unknown; moreover, it was not anticipated that the mono-ethers of glycol would not behave differently towards phosphoric acid than the glycols themselves. It was further surprising that total esterification may also be effected by means of phosphorus oxychloride at all.

The products thus obtainable correspond to the general formula

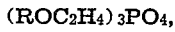

wherein R means alkyl or aryl.

The same method is also applicable to the formation of mixed esters in which the phosphoric acid is esterified with two or three different glycolmonoether groups. Representatives of this class are, by way of example, di(methoxyethyl) butoxyethylphosphate, di(propoxyethyl) butoxyethylphosphate. This group corresponds to the general formula

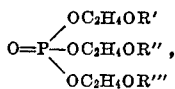

wherein R', R" and R"' represent alkyl or aryl and wherein R', R" and R"' may be either different or partially identical radicals.

Furthermore, the ethylene group $C_2H_4$ in these general formulæ may also be substituted by propylene or butylene.

Under this condition the general formula of my new products reads as follows:

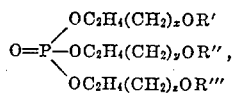

wherein R', R" and R"' represent alkyl or aryl, and wherein $x$, $y$, and $z$, stand for 0, 1 or 2.

Finally, according to the present invention, also mixed phosphoric acid esters may be produced in which esterification is partially effected by an alcohol of any kind (alkyl as well as aryl) and partially by a glycolmonoether. Examples of the resulting products are di(ethoxyethyl) butylphosphate of the formula

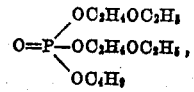

di(methoxyethyl) benzylphosphate of the formula

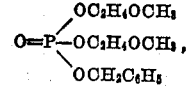

all being based on the general formula

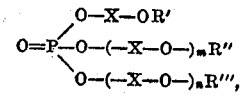

wherein R', R", R"' represent alkyl, halogenoalkyl, phenyl or benzyl, wherein X stands for ethylene, propylene or butylene and $m$ and $n$ mean 0 or 1.

Esterification of the phosphoric acid by the glycol-ether groups may either precede or follow that of the alcohols or phenols.

The tertiary phosphates of the uniform or mixed mono-alkyl- (or aryl-) ethers above mentioned are colorless substances having a high boiling point, which are difficultly inflammable and exceedingly stable.

The particular advantages of the phosphoric acid esters described, as distinguished from the known esters of glycol-ethers of organic acids, subtantially reside in their higher boiling point and their smaller vapor tension. The lower homologues of the uniform esters, for instance, tri(ethoxyethyl) phosphate of the formula

are water-soluble, whereas the higher homologues are not; substitution of only a single ethoxy ethyl group by butoxyethyl may already suffice to produce insolubility in water.

The principal point of importance with respect to these various homologues consists in that they are particularly suitable as gelatinizers and softeners for nitro- and acetyl cellulose as well as for the most various cellulose esters and cellulose ethers; when employed in this manner the lower homologues display a greater dissolving capacity for the cellulose derivatives than the higher ones.

The dissolving efficiency of these products towards cellulose derivatives which is represented by their different gelatinizing effect upon the latter, may be regulated and utilized by correspondingly selecting the esterifying groups. Thus acetyl-cellulose is difficultly gelatinized by tri(butoxyethyl) phosphate, whereas di(methoxyethyl) butoxyethylphosphate easily effects gelatinization. The number of technically useful gelatinizers for cellulose derivatives is thus materially increased.

In further pursuance of the invention I have found that such glycol-ethers in which hydrogen is substituted by a halogen, for example, chlorine or bromine, lend themselves to esterification by means of phosphoric acid in the same manner as above described. These products which have the same external appearance as the products made from non-substituted glycol-ethers are also capable of acting as gelatinizers and softeners. Moreover, they cause a further reduction of inflammability in the plastic masses made from acetylcellulose. They are advantageously employed in combination with the non-halogenized esters, as masses displaying a remarkable clarity result therefrom.

My invention may be illustrated by the following examples. It is, however, obviously not limited to the specific starting materials and conditions stated therein.

*Example 1*

153 parts by weight of phosphorus oxy-chloride are run into 1200 parts by weight of ethoxyethyl alcohol of the formula $$C_2H_5OCH_2CH_2OH$$

at room temperature while stirring. The liquid is then heated for two hours to 50° C. After cooling to about 20° C., anhydrous sodium carbonate is added until an alkaline reaction is produced whereupon the sodium carbonate in excess is filtered off by suction and washed with a small quantity of ethoxyethyl alcohol. The filtrate is subjected to distillation, this first resulting in the transition of the surplus ethoxyethyl alcohol whereas tri(ethoxyethyl) phosphate passes over at 225° C. when applying a vacuum of about 20 mms. mercury column. The ester appears as a colorless liquid having a density of 1.078 (at 20° C.), its index of infraction being 1.437. The yield amounts to 85–90 percent. The acid esters formed in the course of the operation in small quantities are contained in the sodium carbonate as their respective sodium salts and may be recovered therefrom in the known manner. The main product is soluble in water as well as in organic solvents such as alcohol, ether, chlorinated hydrocarbons (such as methyl-chloride, carbon tetrachloride), benzene, toluene, cyclohexanol, acetone, acetic ester.

*Example 2*

1600 parts by weight of butoxyethyl alcohol of the formula $$C_4H_9OCH_2CH_2OH$$

are intimately mixed while stirring with 153 parts by weight of phosphorus oxy-chloride at 20° C. The temperature is then raised to 45–50° C. and maintained during three hours. After cooling the liquid is washed with an aqueous solution of sodium carbonate until it appears neutral and the ester separated from the sodium carbonate solution is subjected to distillation in vacuo. After the excess of butoxyethyl alcohol is driven off, the tri(butoxyethyl) phosphate passes over at 255° C. and 10 mms. mercury column and is obtained by condensation as a colorless liquid having the density of 1.009 (at 20° C.) and an index of infraction of 1.436. The yield amounts to about 85 percent. The ester is insoluble in water, but soluble in the organic solvents enumerated in Example 1.

*Example 3*

1700 parts by weight of phenoxyethyl alcohol are gradually mixed with 153 parts by weight of phosphorus oxy-chloride at room temperature while stirring, the temperature in the course of procedure rising to about 50° C. When the reaction is completed the liquid is treated with ether, the tri(phenoxyethyl) phosphate being precipitated as a white powder of crystals. The yield amounts to about 92 percent of the theoretical one. The product is insoluble in water but recrystallizes from hot alcohol in the shape of white leaflets having a melting point of 142° C.

*Example 4*

To 2000 parts by weight of butoxypropyl alcohol of the formula $$C_4H_9OC_3H_6OH$$

are added 153 parts by weight of phosphorus oxychloride at room temperature while stirring, whereupon a temperature of 40–50° C. is maintained during three hours. After cooling to room temperature the liquid is washed with diluted sodium carbonate solution and the ester separating from the latter is distilled in vacuo. After the excess of propyleneglycolmonobutylether has passed over, tri(butoxypropyl) phosphate is distilled off at 248° C. and 10 mms. mercury column. The ester is a colorless clear neutral liquid which is immiscible with water.

*Example 5*

153 parts by weight of phosphorus oxy-chloride are run into 152 parts by weight of methoxyethyl alcohol at about 5° C. while stirring. The mixture is then heated to 30–40° C. and 600 parts by weight of butoxyethyl alcohol are gradually added. When the reaction is completed the product is washed with aqueous sodium carbonate solution and distilled in vacuo. After the excess of butoxyethyl alcohol is removed the di(methoxyethyl) butoxyethylphosphate passes over at 215–220° C. and 20 mms. mercury column as a colorless clear liquid having a density of 1.058 (at 20° C.) and an index of infraction of 1.431. The yield is about 86 percent of the theoretical one.

*Example 6*

The di(ethoxyethyl)butylphosphate is produced in the manner described in Example 5 when the di(ethoxyethyl) phosphorusoxychloride preliminarily formed by the reaction of two mols of ethoxyethyl alcohol and one mol phosphorus oxy-chloride is subjected to reaction with an excess of butyl-alcohol. The product is a colorless clear liquid having a density of 1.028 (at 20° C.) and a boiling point of 200–250° C. at a pressure of 20 mms. mercury column.

*Example 7*

276 parts by weight of phenoxyethyl alcohol are run into 305 parts by weight of phosphorus-oxychloride at room temperature, the temperature in the course of the reaction rising to about 30° C. A temperature of 50° C. is then maintained for about one hour whereupon the product is cooled to room temperature. Then 1800 parts by weight of methoxyethyl alcohol are run into that intermediate product whereupon the mixture is further heated to 60° C. for about two hours so as to complete the reaction. Sodium carbonate is added, the mixture then filtered and the filtrate subjected to distillation in vacuo at 225–235° C. and 20 mms. mercury column. 514 parts by weight of a pure ester are recovered, this amounting to a yield of 77 percent of the theoretical one. This ester is a colorless liquid, having a density of 1.117 (at 20° C.) and an index of infraction of 1.457.

*Example 8*

In order to produce di(chlorethyl) ethoxyethyl phosphate 320 grams of ethylenechlorhydrine (Cl.C$_2$H$_4$.OH)

are slowly run into 305 grams of phosphorus oxychloride while stirring and cooling. The liquid is heated to 55° C. for three hours, then cooled to room temperature whereupon 1500 grams by weight of ethoxyethyl alcohol are added and the product is reheated to 60° C. for about one hour. An excess of dried sodium carbonate is then stirred into the mass, the undissolved sodium carbonate being filtered off by suction and finally the surplus ethoxyethyl alcohol is distilled in vacuo. The pure ester containing about 24 percent of chlorine is left behind; the specific weight of the latter is 1.26 at 20° C. and the index of infraction amounts to 1.453. The yield is 90 percent of the theoretical one.

*Example 9*

160 grams of ethylenechlorhydrine (Cl.C$_2$H$_4$.OH)

are run into 305 grams of phosphorus oxy-chloride at 10–20° C. while stirring. The product is then heated to 55° C. for one hour, and cooled to room temperature whereupon 153 gs. of methoxyethyl alcohol are gradually added.

Reheating of the mass to 55° C. for one hour is followed by a cooling to 20° C. and the addition of 1500 gs. of butyl-alcohol, the temperature being raised to 60° C. within an hour. Dry sodium carbonate is then added whereupon the excess of sodium carbonate is separated and the butyl-alcohol in excess is distilled off. The resulting chlorethyl-methoxyethyl butyl phosphate is distilled in vacuo, the product passing over at 195–205° C. at a pressure of 13 mms. mercury column. Yield 75 percent of the theory density 1.130 (at 20° C.), index of infraction 1.436.

*Example 10*

90 gs. of bromo ethylenebromhydrine are slowly run into 110 gs. of phosphorus-oxy-chloride while cooling, followed by heating to 45° C. during one hour. After cooling to room temperature 55 gs. of methoxyethylalcohol are added; thereupon follows a reheating to 55° C., cooling to 20° C. and addition of 700 gs. of butoxyethyl alcohol. The mass is then heated to 60° C. for one hour and stirred with an excess of dry sodium carbonate, the undissolved sodium carbonate being filtered off. The excess of butoxyethyl alcohol is distilled off. The bromethylmethoxyethyl-butoxyethyl-phosphate containing 21 percent of bromine thus obtained may be purified by distillation in vacuo, this occurring at 205–210° C. and 7 mms. pressure. Density 1.205 (at 20° C.), index of infraction 1.443, yield about 70 percent of the theory.

*Example 11*

A current of chlorine is passed during eight hours into 500 gs. of di(methoxyethyl)butoxyethyl-phosphate. The temperature gradually rises to about 40° C. while moderate amounts of hydrochloric acid gas are disengaged. In order to remove an excess of chlorine and hydrochloric acid gas the product is blown with air and then stirred with dry sodium carbonate. After the excess of the latter is separated by filtration, the product of chlorination is distilled for purposes of purification; it passes over at 180–230° C. and 15 mms. pressure and contains 4.3 percent of chlorine.

I claim:

1. The phosphoric acid esters corresponding to the general formula

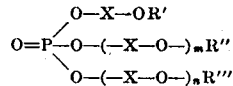

wherein R', R'', R''' represent alkyl, halogenoalkyl, phenyl or benzyl, wherein X stands for ethylene, propylene or butylene, and $m$ and $n$ mean 0 or 1, said esters being colorless substances of high boiling point, being difficultly inflammable and exceedingly stable and acting as gelatinizers and softeners for cellulose esters and ethers.

2. The phosphoric acid esters corresponding to the general formula

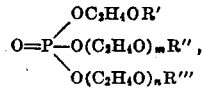

wherein R', R'', R''' represent alkyl, halogenoalkyl, phenyl or benzyl, wherein $m$ and $n$ mean 0 or 1, said esters being colorless substances of high boiling point, being difficultly inflammable and exceedingly stable and acting as gelatinizers and softeners for cellulose esters and ethers.

3. The phosphoric acid esters corresponding to the general formula

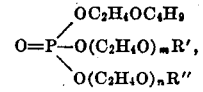

wherein R' and R'' represent alkyl, halogenoalkyl, phenyl or benzyl, wherein $m$ and $n$ mean 0 or 1, said esters being colorless substances of high boiling point, being difficultly inflammable and exceedingly stable and acting as gelatinizers and softeners for cellulose esters and ethers.

4. The phosphoric acid esters corresponding to the general formula

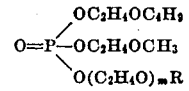

wherein R represents alkyl, halogenoalkyl, or phenyl or benzyl, and wherein $m$ means 0 or 1, said esters being colorless substances of high boiling point, being difficultly inflammable and exceedingly stable and acting as gelatinizers and softeners for cellulose esters and ethers.

5. The phosphoric acid ester corresponding to the formula

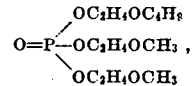

being a colorless clear liquid, having a density of 1.058 at 20° C. and an index of infraction of 1.431, and boiling at 215 to 220° C. at a pressure corresponding to 20 mm. mercury column.

6. The process which comprises acting with phosphorus oxychloride upon a glycolmonoether corresponding to the general formula $$RO(CH_2)_x—OH,$$

wherein $x$ meaning 2, 3 or 4 and R stands for alkyl or phenyl, said glycolmonoether being present in an amount surpassing that theoretically required for the formation of neutral phosphate.

7. The process which comprises acting with phosphorus oxychloride upon a glycolmonoether corresponding to the general formula $$alk\ O\ (CH_2)_x—OH,$$

wherein alk means alkyl and $x$ stands for 2, 3 or 4, said glycolmonoether being present in an amount surpassing that theoretically required for the formation of neutral phosphate.

8. The process which comprises acting with phosphorus oxychloride upon a glycolmonoether corresponding to the general formula $$alk—OCH_2—CH_2—OH,$$

wherein alk means alkyl, said glycolmonoether being present in an amount surpassing that theoretically required for the formation of neutral phosphate.

9. The process which comprises acting with phosphorus oxychloride upon a monohydric aliphatic alcohol and a glycolmonoether corresponding to the general formula $$RO(CH_2)_x—OH,$$

wherein $x$ meaning 2, 3 or 4 and R stands for alkyl or phenyl, said glycolmonoether and aliphatic alcohol being present in an amount surpassing that theoretically required for the formation of neutral phosphate.

10. The process which comprises acting with phosphorus oxychloride upon a monohalogenated monohydric aliphatic alcohol and a glycolmonoether corresponding to the general formula $$RO(CH_2)_x—OH,$$

wherein $x$ meaning 2, 3 or 4 and R stands for alkyl or phenyl, said glycolmonoether and halogenated aliphatic alcohol being present in an amount surpassing that theoretically required for the formation of neutral phosphate.

CURT SCHÖNBURG.